United States Patent [19]
Backman, Jr. et al.

[11] 3,852,705
[45] Dec. 3, 1974

[54] SONAR DEPTH TRACKING SYSTEM

[75] Inventors: William R. Backman, Jr., Portsmouth; George M. Walsh, Middletown, both of R.I.

[73] Assignee: Raytheon Company, Lexington, Mass. ; by said George M. Walsh

[22] Filed: Mar. 26, 1973

[21] Appl. No.: 345,026

Related U.S. Application Data

[63] Continuation of Ser. No. 146,729, May 25, 1974, abandoned.

[52] U.S. Cl. .................................. 340/3 R, 343/7.3
[51] Int. Cl. ............................ G01s 9/68, G01s 7/66
[58] Field of Search ............ 340/1 R, 1 C, 3 R, 3 E; 343/5 DP, 7.3, 7.5

[56] References Cited
UNITED STATES PATENTS 3,131,389  4/1964  Van Staaden........................ 343/7.3
3,500,302  3/1970  Moss, Jr. et al..................... 340/3 R Primary Examiner—Richard A. Farley
Attorney, Agent, or Firm—J. D. Pannone; Milton D. Bartlett; D. M. Warren

[57] ABSTRACT

A system, selectively responsive to the first, peak, or last portion of a radiant energy signal for displaying a gate which brackets the radiant energy signal and also provides means for inhibiting the generation of such signal during a preset time interval preceding the gate. Means are also provided for automatically widening the gate and repositioning the gate to insure tracking of the radiant energy signal. The system is particularly adapted for monitoring a sonar depth recording to provide audible and visual alarms when the sonar data becomes excessively noisy and during sudden changes in the water depth.

22 Claims, 8 Drawing Figures

SONAR DEPTH TRACKING SYSTEM

This is a continuation of application Ser. No. 146,729 filed May 25, 1971, now abandoned.

BACKGROUND OF THE INVENTION

Systems for transmitting and receiving radiant energy, particularly sonar systems, advantageously employ a recording device such as the familiar depth recorder which provides a continuous visible record of the depth of a reflecting surface. As is well known in sonar depth measurements made from a ship travelling along the ocean, the depth measurements may change relatively slowly with time until, for example, the ship approaches a channel at the entrance to a harbor in which case the depth may change rather rapidly. A problem exists in that a sonar operator may wish to observe a graphical recording of the ocean bottom at occasional intervals due to the relatively slow change in depth and, accordingly, may fail to notice when the channel is reached. Or, as a further example, the sudden appearance of marine life with its attendant change in the apparent depth of the ocean may go unnoticed when the operator monitors the depth recording only at occasional intervals. Furthermore, there is a problem in a noisy environment, whether it be due to a heavy sea state or to marine life, in that the task of interpreting the sonar data is more laborious, and in particular, such sonar data is more readily interpreted by the plotting of the first, peak, or last echo of the raw data signal appearing in a predetermined interval of time.

SUMMARY OF THE INVENTION

The foregoing situations are provided for in a system in accordance with the invention which comprises means for transmitting radiant energy signals towards a reflecting subject, such as the ocean bottom, means for receiving such reflected echoes and means for displaying these echoes as a function of time or distance by means of a recorder such as a graphical recorder of depth customarily used with sonar systems. In addition, means are provided for displaying a gate which brackets the data of the recording apparatus, the displaying of the gate being implemented preferably by energizing the stylus of a graphical recorder to print a mark shortly before the anticipated occurrence of an echo and shortly thereafter so that an estimation of the possible times of occurrence of an individual echo is presented to an operator of the sonar system. Count-down circuits triggered in response to a key signal from the recorder stylus provide the leading edge, the trailing edge, and a center mark of the gate which brackets the data points. These counters count down from the distance or depth measurement of a preceding data point for estimating the range of a succeeding data point, and also provide a transmission-inhibiting gate to preclude the occurrence of transmission reverberations that may occur concurrently with a received echo. The actual range is also stored in digital circuitry, this range being derived by logic means from either the first, peak, or last portion of an echo arriving at the receiving means. In the event that echoes arise outside the gate on successive occassions, an alarm is sounded and the gate is widened automatically.

BRIEF DESCRIPTION OF THE DRAWINGS

The aforementioned features and other advantages of the invention are explained in the following description taken in connection with the accompanying drawings wherein.

DESCRIPTION OF THE PREFERRED EMBODIMENT

Figure 1:
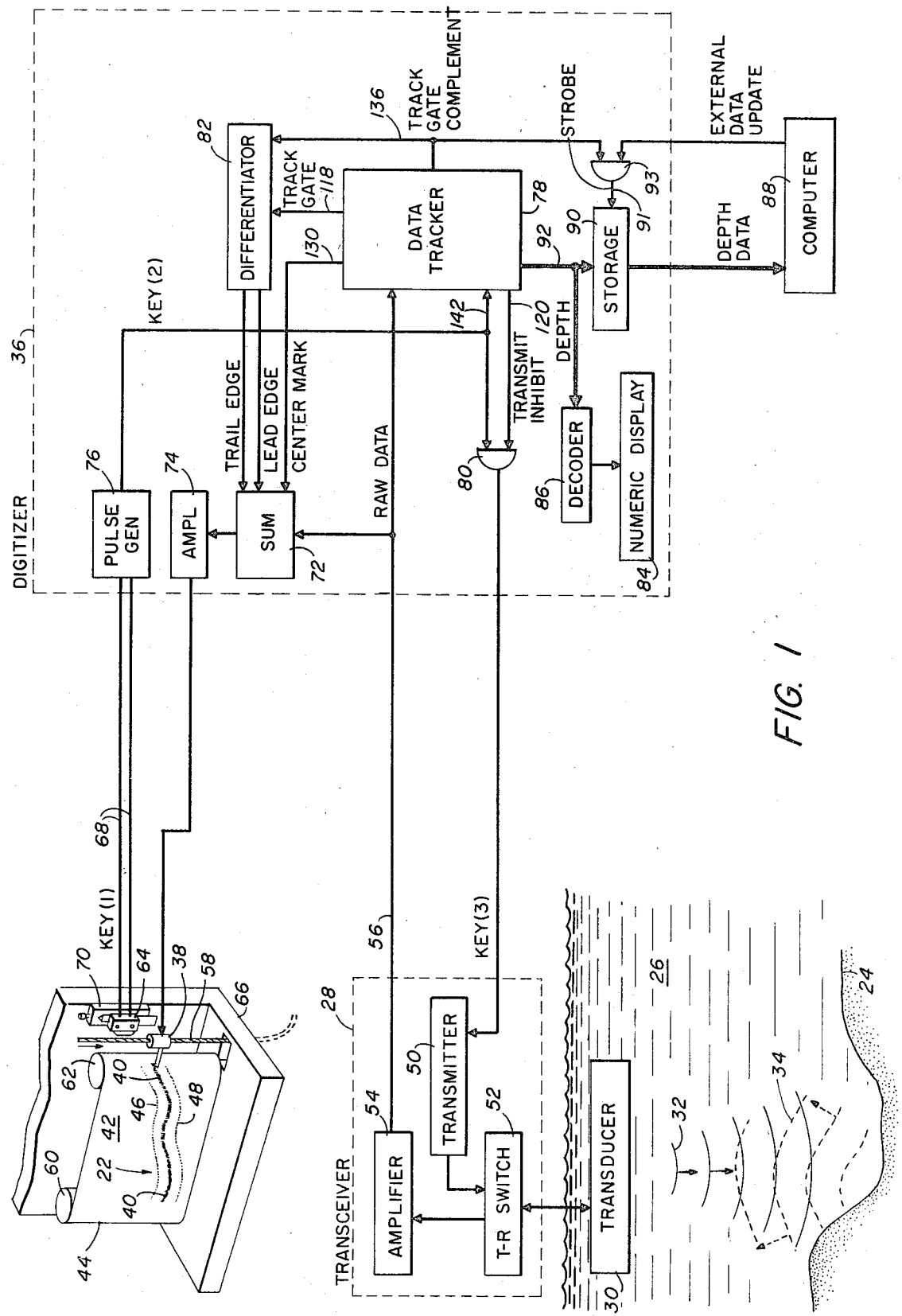
FIG. 1 is a block diagram of the recording, transceiving, and digital data processing portions of a depth tracking system in accordance with the invention.

Referring now to FIG. 1, there is seen a diagrammatic view of a system 20 for providing a graphical recording 22 of the bottom 24 of an ocean 26. A transceiver 28 utilizes a transducer 30 for transmitting waves 32 of sonic radiation, indicated by solid lines, towards the ocean bottom 24 and for receiving waves 34 of sonic energy, indicating by dashed lines, which are reflected from the ocean bottom 24 to the transducer 30. In accordance with the invention this reflected energy, or echo, is then coupled via the transceiver 28 to a digitizer 36 which converts this energy into an electrical signal for activating a stylus 38 to print a mark 40 on the paper 42 of marks recorder 44. A number of marks 40 are indicated in FIG. 1, one such mark being provided for each echo. The marks 40 in combination with dots 46 and 48 representing respectively the leading and trailing edges of a tracking gate, to be described hereinafter, comprises the graphical recording 22 of the ocean bottom 24.

The transducer 30 is of a well known form commonly used in sonar and may be positioned on the keel of a ship (not shown in the Figures) or towed behind the ship and submerged within the waters of the ocean 26 for coupling sonic energy into the ocean 26. The transceiver 28 is similarly of a well known design customarily used in sonar applications and may comprise a transmitter 50 which generates a pulse of sonic energy for transmission via a transmit-receive (T-R) switch 52 of conventional form to the transducer 30, and an amplifier 54 for amplifying echoes received from the transducer 30 via the T-R switch 52 to provide a signal indicated as raw data on line 56 for the digitizer 36. Similarly, the recorder 44 is of a well known format having a drive means 58, partially seen in the Figures, for driving the stylus 38 along the surface of the paper 42 such that the spacings of the marks 40 from the edge of the paper 42 represents the depth of the ocean bottom 24. The paper 42 is moved slowly across the path of the stylus by means of rollers 60 and 62 so that successive marks 40 represent successive positions along the ocean bottom 24. A microswitch 64 is mounted on the frame 66 (partially seen in the Figure) of the recorder 44 adjacent the path of the stylus 38 to be activated by the stylus 38 near the beginning of each stroke of the stylus 38, and thereby provides a closure of an electrical circuit indicated by wires 68 to generate a key pulse signal to be described hereinafter. A phasing adjust 70 affixed to the frame 66 is provided for adjusting the position of the microswitch 64 to accelerate or delay the operation of the microswitch 64, this being a convenient method of compensating the graphical recording 22 for the depth of the transducer beneath the surface of the ocean 26.

The digitizer 36 in response to the key pulse signal, shown at wires 68 by KEY(1) provides a signal, indicated in the Figure as KEY(3), for activating or keying the transmitter 50 for the generation of a pulse of sonic energy, and also tracks the raw data to provide the dots 46 and 48 indicating the leading and trailing edges of tracking gates. Signals representing the leading edge, trailing edge, as well as a center mark (not shown in the Figure) are summed together with the raw data by a summer 72 and then amplified by amplifier 74 for activating the stylus 38 to print the graphical recording 22. The center mark may also be displayed, when desired, on the paper 42 as an aid to positioning the track gate. The closure signal KEY(1) is utilized to activate a pulse generator 76 to provide a key pulse signal indicated on the Figure as KEY(2) which activates a data tracker 78 and, via AND gate 80, provides the KEY(3) signal.

The digitizer 36 provides the KEY(3) signal periodically in correspondence with each pass of the stylus 38, except when the pulse of sonic energy provided by the transmitter 50 would occur at approximately the same time as the echo waves 34 are received at the transducer 30. In such a situation it is desirable to inhibit the transmission by the transmitter 50 so that reverberations in the ocean 26 from such a transmission would not obscure the reception of the echo waves 34. Accordingly, the data tracker 78 provides, in a manner to be described, a transmit inhibit signal which deactivates the gate 80 so that the KEY(2) signal does not pass the gate 80 to provide the KEY(3) signal. This is readily accomplished by digital logic by providing the transmit inhibit signal with a polarity opposite that of the KEY(2) signal so that the AND gate 80 does not produce an output pulse upon the occurrence of the KEY(2) pulse.

The data tracker 78 provides a track gate and a track gate complement, in a manner to be described, which are applied to a differentiator 82 which differentiates the leading edge of the track gate and the trailing edge of the track gate complement to provide pulses which are respectively the leading and trailing edge signals.

Figure 6:
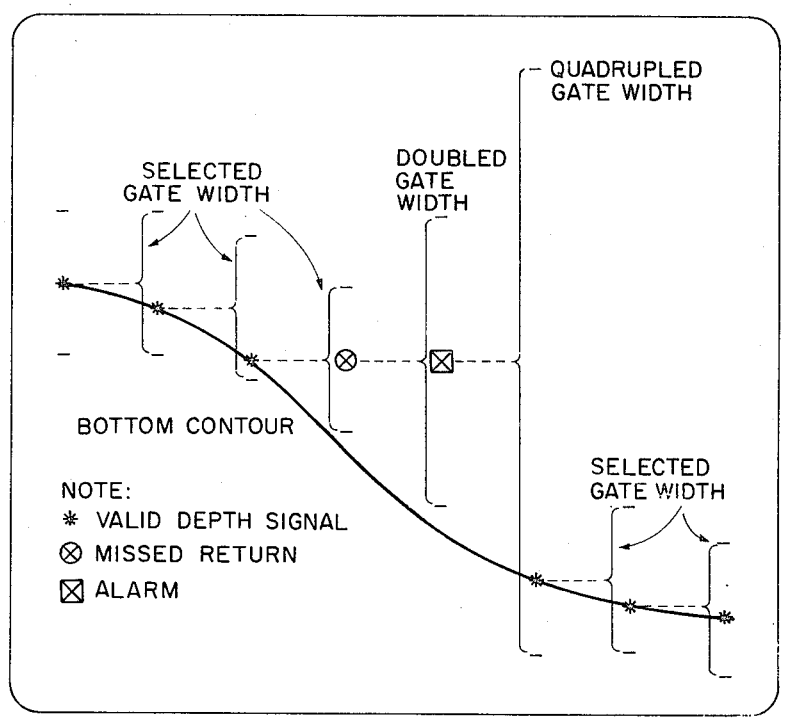
FIG. 6 is a detailed pictorial view of the data displayed on the recorder of FIG. 1 including the display of the gate which brackets each data point of the recording.

A numerical display 84, seen also in FIG. 6, shows the depth corresponding to the time of occurrence of each echo. The numerical display 84 is of a well known form such as an indicator panel comprised of segments of numbers with each segment being energized by signals from a decoder 86 in response to digital depth data provided by the data tracker 78 in a manner to be described. The digital depth data may be in any convenient format such as binary coded decimal (BCD). Such a decoder and numerical display are well known and will not be described further.

It is frequently desirable to provide digital depth data to a computer 88. This is readily accomplished by means of an intermediate storage unit 90 which may comprise for example a register of flip-flops (D-latch) having individual binary states which are set in response to a strobe signal on line 91 to the values of the binary states of the digital representation of the depth. The depth signal is represented by a heavy line 92 which indicates a set of parallel lines one for each of the bits in the BCD format of the depth data. The strobe signal is provided by AND gate 93 in response to the combined occurrence of the track gate complement and a signal, external data up-date, provided by the computer 88. The track gate complement is represented by a logic state of 1 at all times except during the occurrence of the track gate when it is represented by a 0. The external data up-date signal is represented by a logic state of 1 when the computer desires to up-date the depth stored in the storate unit 90. The combining of the track gate complement signal and the external data up-date signal insures that the storage unit 90 cannot be up-dated during the time interval of the track gate during which time the data tracker 78 is up-dating the depth data in a manner to be described hereinafter.

It is also noted that in the event the digitizer 36 is utilized with a recorder similar to recorder 44 which does not have a phasing adjust 70, the compensation for the depth of the transducer 30 can be obtained by providing a pulse generator similar to pulse generator 76 which further includes an adjustable delay so that the KEY(2) signal may be delayed relative to the KEY(1) signal.

Figure 2:
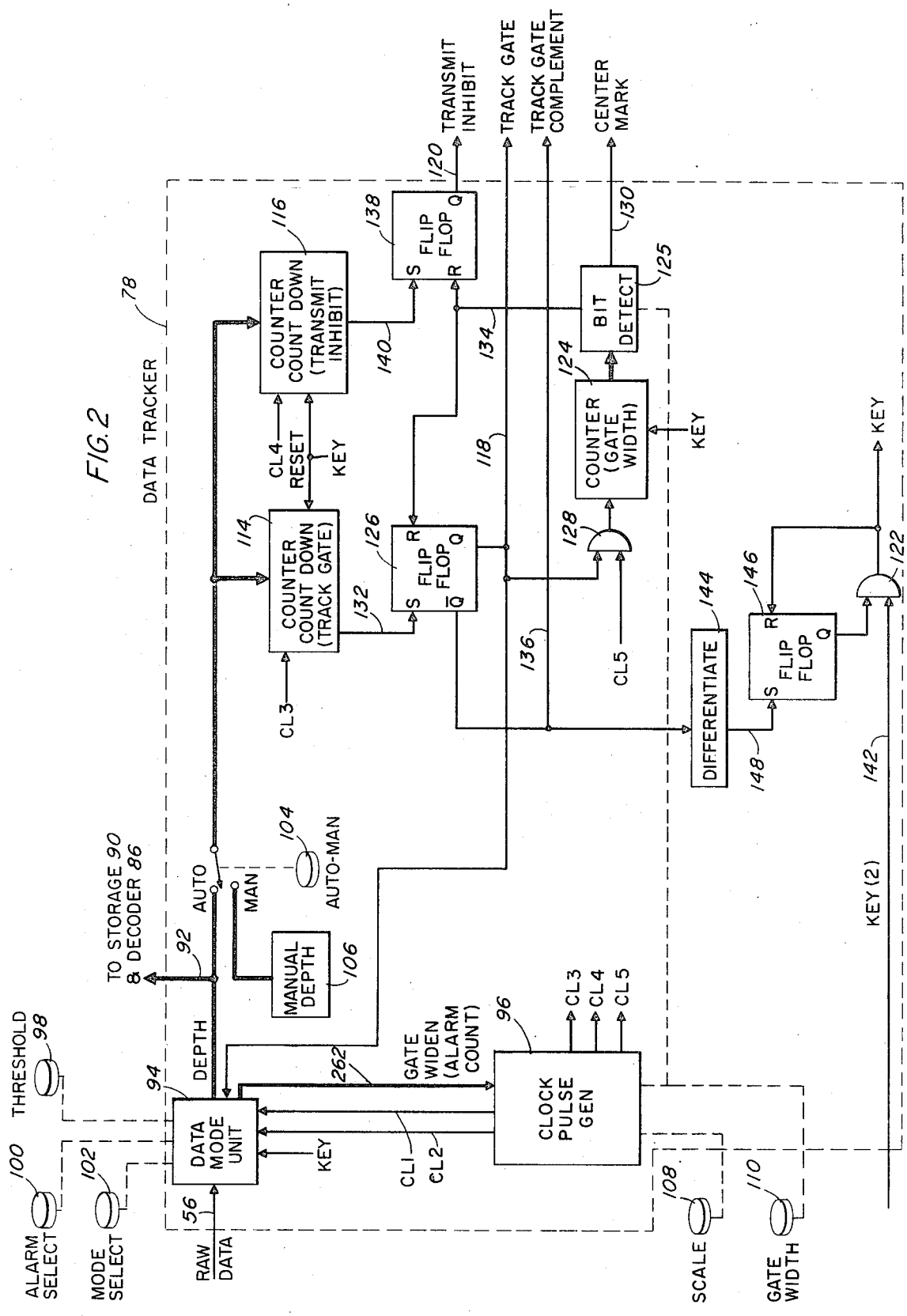
FIG. 2 is a detailed block diagram of a data tracker utilized in the digitizer circuitry of FIG. 1.
Figure 8:
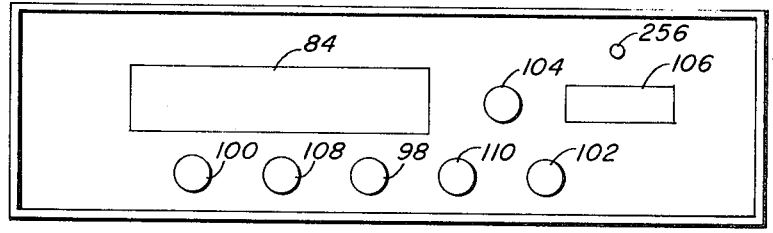
FIG. 8 is a control panel for the digital processing unit.

Referring now to FIG. 2 there is shown a block diagram of the data tracker 78 which comprises a data mode unit 94, seen in FIG. 3, a clock pulse generator 96, seen in FIG. 4, and a set of manual controls, seen also on the control panel of FIG. 8, these controls being a threshold 98, alarm selector 100, mode selector 102, AUTO-MAN selector 104, manual depth 106, scale 108 and gate-width 110, all of which will be described hereinafter.

As seen both in FIGS. 1 and 2, raw data entering on line 56 enters the data mode unit 94 which in response to this raw data provides a digital number in BCD format to the storage unit 90 and the decoder 86 along line 92. The data on line 92 is also applied to counter 114 and counter 116 which are utilized respectively for initiating the track gate on line 118 and the transmit inhibit signal on line 120. Both counters 114 and 116 are preset to the value of the depth on line 92 in response to a KEY signal which is obtained from the KEY(2) signal by means of AND gate 122 in a manner to be described. Both the counters 114 and 116 count down from the value of the depth to a valve of 0. Counter 114 counts clock pulses indicated by CL3 and counter 116 counts clock pulses indicated by CL4, the two clock pulse signals being provided by the clock pulse generator 96 in a manner, to be described with reference to FIG. 4, such that the clock pulses CL4 occur at a more rapid rate than do the clock pulses CL3 during a portion of the count-down time so that the counter 116 reaches 0 before the counter 114. Thereby, the transmit inhibit signal occurs before the occurrence of the track gate to insure that there is no transmission by the transmitter 50 of FIG. 1 with its attendant reverbera- A third counter 124, bit detector 125, flip-flop 126 and AND gate 128 are utilized to provide the trailing edges of both the track gate and transmit inhibit signals on lines 118 and 120 as well as the center mark on line 130 (see also in FIG. 1). The counter 114 provides a signal on line 132 for setting the flip-flop 126 when the counter 114 reaches 0, whereupon the Q-output of flip-flop 126 has the value of a logic state of 1. The track gate on line 118 is represented by a logical 1 state and, accordingly, the setting of the flip-flop 126 by the signal on line 132 initiates the track gate. The presence of a logical 1 at an input of the AND gate 128 permits clock pulses CL5 to pass through the AND gate 128 to the counter 124. The counter 124 counts the pulses CL5 and is reset to 0 by the KEY signal. The bit detector 125 interconnects with individual stages of the counter 124 and provides an output pulse having a logic state of 1 on line 130, the center mark, and also on line 134 when stages of the counter 124 indicate a particular numerical value as selected by the gate-width control 110.

For example, where a set of gate widths 25, 50, 100 and 200 feet is provided (each one double the preceding), the bit detector 125 takes a relatively simple form such as a set of NAND gates responsive to the gate-width control 110. These NAND gates are interconnected with successive stages of the counter 124 and have their outputs combined in a single NAND gate such that a pulse is provided on line 134 when the counter 124 has counted clock pulse CL5 for a duration of time equivalent to the selected width of the track gate. The pulse on line 130 for the center mark would be obtained from the preceding counter stage which represents a duration of one-half the gate width.

The pulse signal on line 134 resets the flip-flop 126 so that a logic state of 0 appears at the Q-output, this logic state of 0 also being applied to AND gate 128 to inhibit the passage of further clock pulses CL5 to the counter 124, whereupon the counter 124 ceases counting and remains at a value of 0. The termination of the logic state of 1 on line 118 by the reset signal on line 134 is the termination, or trailing edge, of the track gate. The track gate complement on line 136 (seen also in FIG. 1) is similarly provided by the Q-output of the flip-flop 126; thus a logic state of 0 on line 118 is accompanied by a logic state of 1 on line 136.

The transmit inhibit signal on line 120 is provided by a flip-flop 138 which is set by a signal on line 140 provided by the counter 116 upon its obtaining a count of 0. The setting of the flip-flop 138 provides a logic state of 1 at its Q-output, the logic state of 1 being the transmit inhibit signal. The flip-flop 138 is reset by the reset signal on line 134 so that the termination of the transmit inhibit signal occurs simultaneously with the termination of the track gate. As has been noted above, the beginning of the transmit inhibit signal occurs earlier than the leading edge of the track gate since the counter 116 reaches its count of 0 before the counter 114 reaches its count of 0.

The KEY(2) signal, seen in FIG. 2, provides the KEY signal once during each stroke of stylus 38 of FIG. 1. Should it be desirable to insure against the possibility of a spurious signal on line 142 which would have the effect of resetting the data tracker 78 prematurely, there may be provided a circuit such as a circuit comprising the differentiator 144, the flip-flop 146 and the AND gate 122. This circuit operates as follows. The KEY signal resets the flip-flop 146 producing a logic state of 0 at an input of the AND gate 122 thereby inhibiting the passage of any further signals on line 142. The track gate complement provided by the flip-flop 126 is applied to the differentiator 144 which, in response thereto, provides a pulse signal on line 148 at the occurrence of the trailing edge of the track gate, this pulse signal on line 148 setting the flip-flop 146 so that a logic state of 1 is applied to the AND gate 122 thereby enabling the passage of a signal on line 142 occurring subsequently to the termination of the track gate.

Referring now to FIGS. 1 and 2 the dots 46 and 48 representing the leading end trailing edges of the track gate on the graphical recording 22 may be positioned manually by switching the AUTO-MAN switch 104 to the manual depth control 106. As seen in FIG. 8, the manual depth control is a set of thumb-wheel switches of a standard form having a self contained encoder which provides a digital number in BCD format corresponding to the depth which is manually set on the front panel of the digitizer 36. Adjustment of the manual depth control 106 permits the counter 114 to be preset to any desired depth rather than to the depth appearing on line 112 of FIG. 2. This mode of operation permits an operator to conveniently position the track gate at the anticipated range of the raw data echo on line 56 to initiate the tracking of the raw data.

Figure 4:
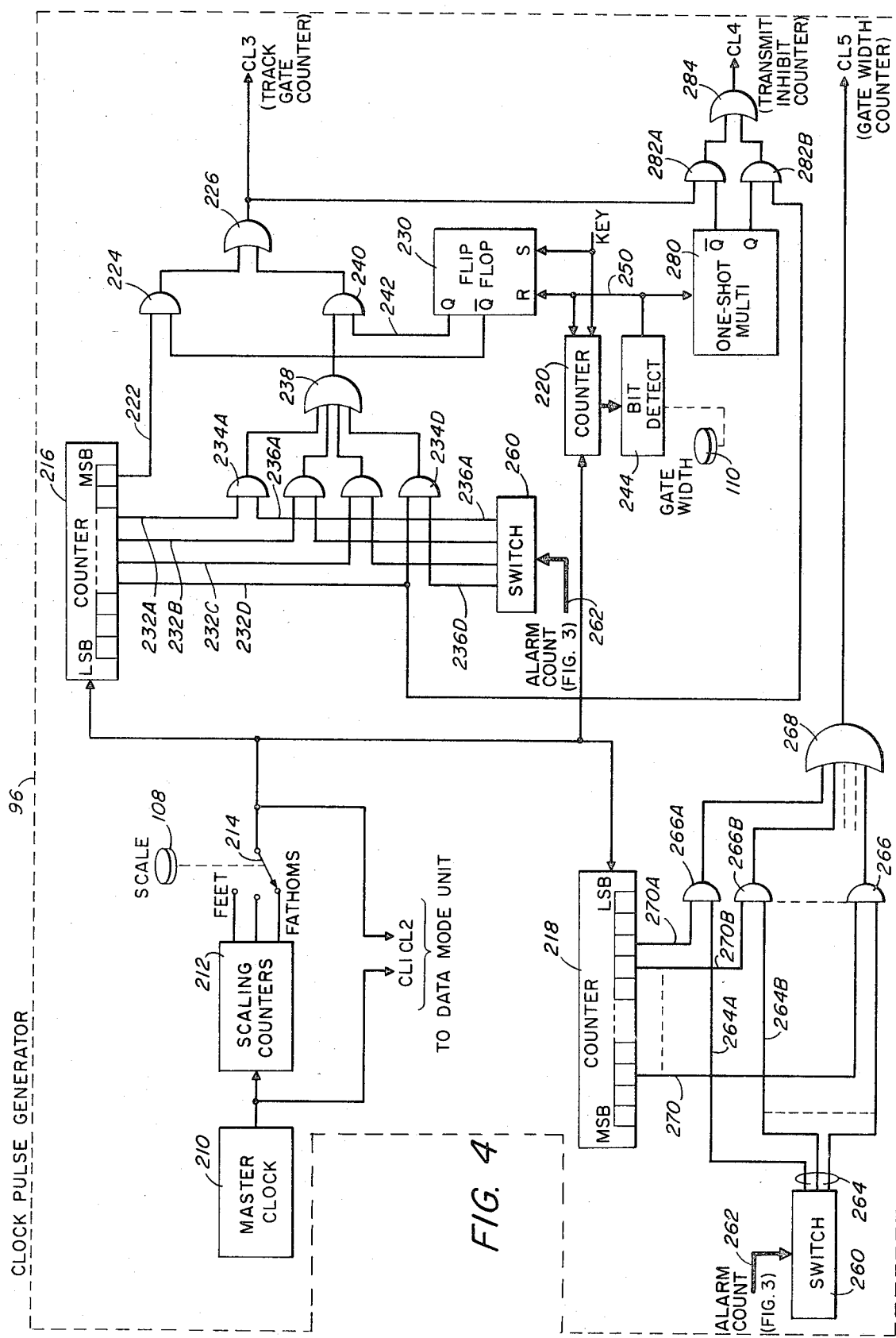
FIG. 4 is a detailed block diagram of a clock pulse generator which provides clock pulses at various frequency rates to counters utilized in FIGS. 2 and 3.
Figure 5:
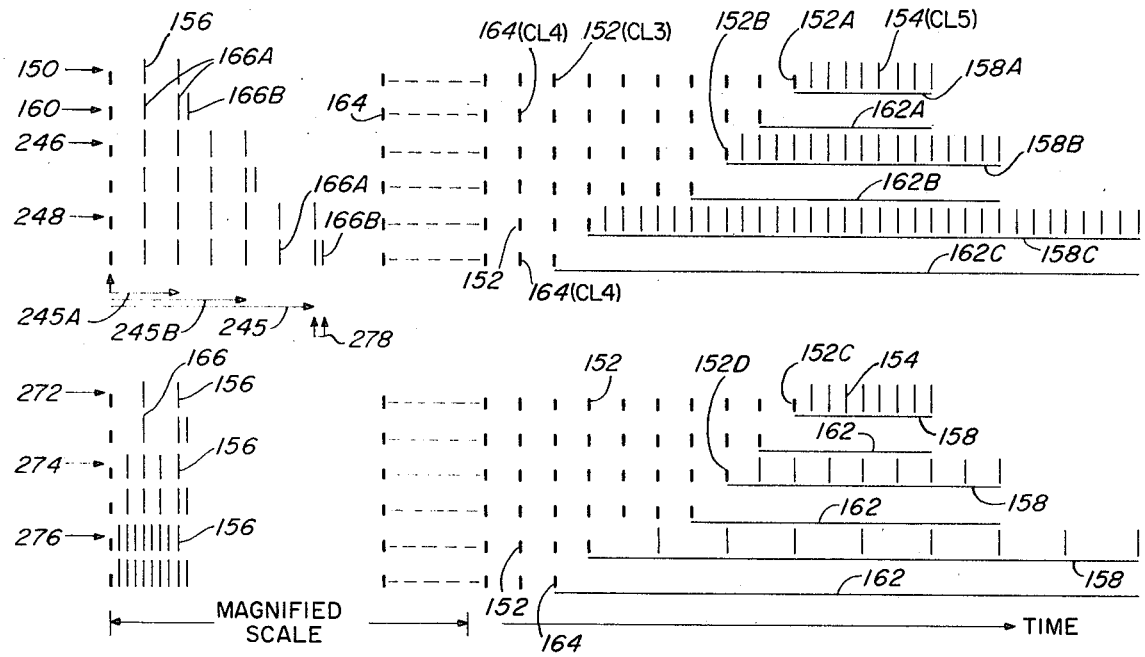
FIG. 5 is a timing diagram showing the count-down to the leading edge of the track gate for variable track gate width.

Referring momentarily to the timing diagram of FIG. 5, graph 150 shows clock pulses which are counted by the counters 114 and 124 of FIG. 2 in providing the track gate on line 118. The short stubby marks 152, some of which are further identified by suffixes A–C such as 152A, represent clock pulses CL3 arriving at a regular rate to the counter 114. The long thin marks 154, some of which are similarly further identified by suffixes such as 154A, represent clock pulses CL5 arriving at the counter 124 during the interval of time when the AND gate 128 is activated by the logic state of 1 at the Q-output of the flip-flop 126. The long thin marks 156, some of which are similarly further identified by suffixes such as 156A, represent additional lock pulses CL3 inserted between the regularly occurring clock pulses 152 in a manner which will be described with reference to FIG. 4. The track gate is represented in FIG. 5 by horizontal lines 158, some of which are similarly further identified by suffixes, the length of a line 158 representing the duration of a track gate. Thus, for example, the lines 158A–C represent respectively track gate widths corresponding respectively to 25, 50 and 100 feet of depth in the graphical recording 22 of FIG. 1.

As seen in the graph 150, two additional clock pulses 156 have been inserted between the regularly occurring clock pulses 152. Accordingly, the counter 114 of FIG. 2 reaches a count of 0 two time units earlier than would be the case if the additional clock pulses 156 had not been inserted. It should be noted, in passing, that the number of clock pulses shown in FIG. 5 are presented by way of example for facilitating the description of the operation of the system 20 of FIG. 1, and that in practice many more pulses occur than are seen in the various portions of the graphs of FIG. 5. In the absence of the additional clock pulses 156, the clock pulse 152A would occur at the center of the track gate 158A and that, accordingly, the advanced occurrence by two time units of the clock pulse 152A corresponds to the first half of the track gate 158A. The counter 124 of FIG. 2 begins to count the clock pulses CL5, as described earlier with reference to FIG. 2, when the counter 114 reaches 0 and continues to count until it reaches the number for which the bit detector 125 has been preset by the gate-width control 110. In the graph 150, eight such clock pulses 154 corresponding to four time units are shown during the track gate interval.

Graph 160 shows clock pulses for the generation of the transmit inhibit gate corresponding to the track gate 158A. The transmit inhibit gates of FIG. 5 are represented by horizontal lines 162, some of which are further identified similarly with suffixes. The short stubby marks 164 represent regularly occurring clock pulses CL4 applied to the counter 116 of FIG. 2. The long thin marks 166, some of which are further identified by suffixes, represent additional clock pulses inserted between the regularly occurring clock pulses 164. The additional clock pulses 166A occur during the first half of the period between the clock pulses 164 just as the clock pulses 156 occur during the first half period of the clock pulses 152. It is noted that the left portion of the graphs of FIG. 5 are shown in a magnified scale to better indicate the relative positions of the clock pulses 156 and 166. Still another clock pulse 166B is provided at the beginning of the second half interval between the clock pulses 164 so that the counter 116 reaches a count of 0 prior to the counter 114 of FIG. 2. Thus, as seen in FIG. 5, the transmit inhibit gate 162A begins one time unit prior to the track gate 158A. The two gates terminate at the same point in time since, as was explained with reference to FIG. 2, the reset signal on line 134 is supplied simultaneously to the flip-flops 126 and 138.

Figure 3:
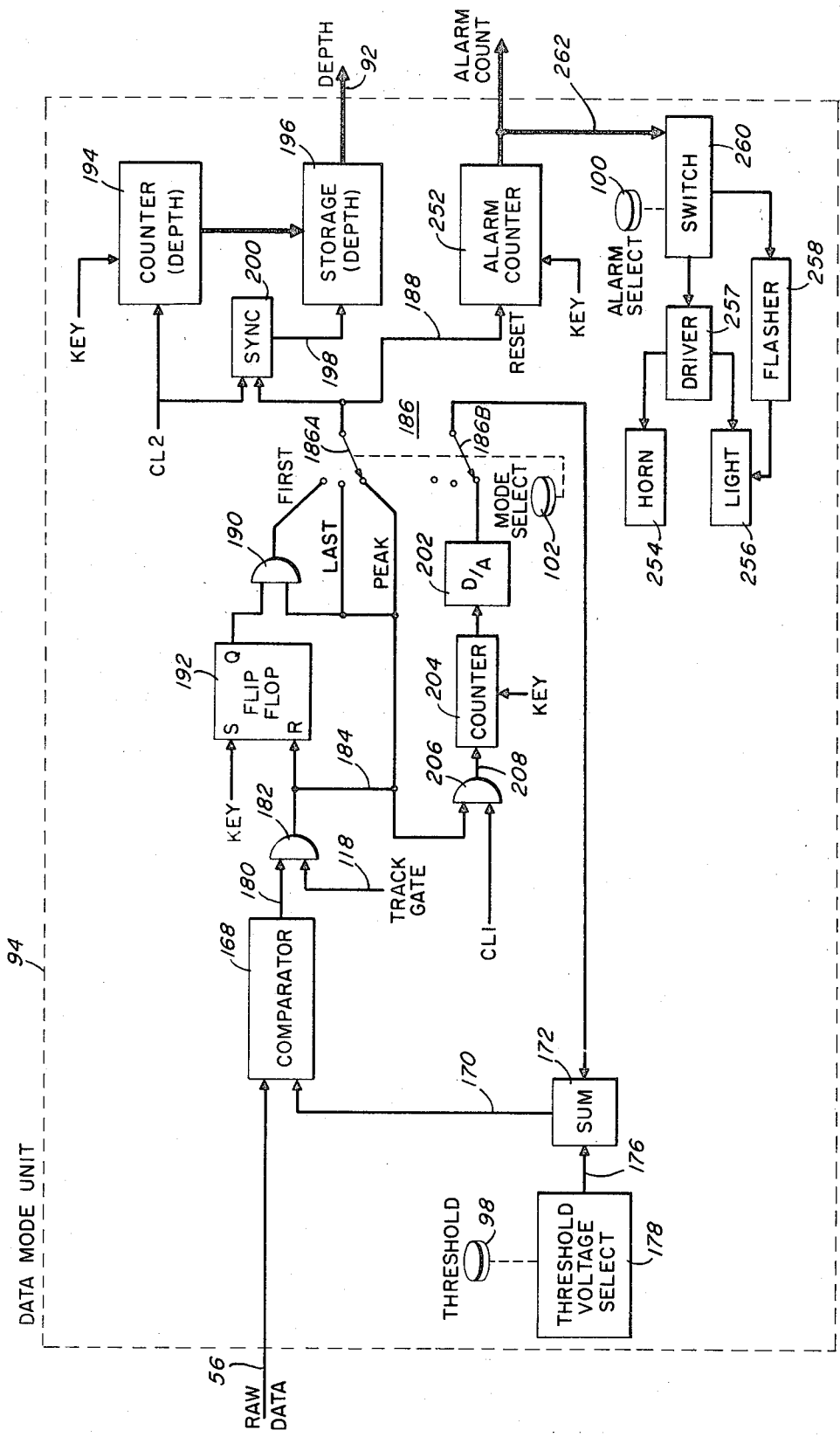
FIG. 3 is a block diagram of the data mode unit, seen in FIG. 2, for selecting the first, peak, or last portion of an echo received by the transceiver of FIG. 1.

Referring now to FIG. 3 there is shown a detailed block diagram of the data mode unit 94 which has been described briefly with respect to FIG. 2. Raw data on line 56 is applied to a comparator 168 which compares the amplitude of the raw data to a reference on line 170 obtained from a summing circuit 172. The summing circuit 172 sums together a signal on line 174 which will be described hereinafter and a reference signal on line 176 from a threshold voltage source 178 which may be, for example, a potentiometer energized from a suitable source of voltage and connected with the threshold control 98. The output of the comparator 168 on line 180 is a voltage having either one of two possible values, one value being greater than the other, the greater value being obtained when the amplitude of the raw data 56 is greater than the amplitude of the voltage on line 170 and the lesser value being provided when the amplitude of the raw data on line 56 is less than the reference voltage on line 170. The comparator output on line 180 and the track gate of FIG. 2 are both applied to an AND gate 182 so that during the interval of time when the track gate is present, a voltage on line 180 having the greater value, corresponding to a logic state of 1, passes through the AND gate 182 onto line 184; while with a voltage on line 180 of the lesser value, corresponding to a logic state 0, the logic state on line 184 remains at 0. The width of a voltage pulse on line 180 corresponding to a logic state of 1 depends (with a sinusoidal signal waveform on line 56) on the difference between the amplitude of the new data on line 56 and the value of the reference on line 170.

A mode select switch 186 having two contactors 186A and 186B is mechanically connected with the mode selector control 102 and provides a signal on line 188 corresponding to either the first, last, or peak signal to appear on line 184 during an interval when the track gate on line 118 is present, the signal on line 184 being a voltage corresponding to the logic state of 1. To obtain a signal on line 188 corresponding to the first occurrence of a signal on line 184, the mode select switch 186 is positioned to the FIRST contact which provides a signal from an AND gate 190 in response to the simultaneous presence of logic states of 1 on line 184 and at the Q-output of flip-flop 192. The flip-flop 192 is set by the KEY signal of FIG. 2 to provide the logic state of 1 at the Q-output, and is reset by the first signal to appear on line 184. Since the signal on line 184 is applied simultaneously to the AND gate 190 as well as to the reset terminal of the flip-flop 192, a pulse signal having a logic state of 1 appears momentarily at the output of the AND gate 190 until the flip-flop 192 has reset. Thereafter, the output of the AND gate 190 reverts to a logic state of 0 independently of the presence of further signals on line 184. Thereby, a pulse signal corresponding to the first occurrence of a signal on line 184 is applied by the switch 186 to the line 188.

A counter 194 counts clock pulses CL2 which are provided by the clock pulse generator 96 of FIG. 4 in a manner to be described. The counter 194 is reset to 0 by the KEY signal so that, thereafter, a number appearing in the counter 194 represents time elapsed from the occurrence of the KEY signal, or equivalently the depth of the ocean bottom 24 of FIG. 1. A storage unit 196 which may be, for example, a register of flip-flops, accepts the contents of the counter 194 when strobed by a signal on line 198. The strobe signal on line 198 is provided by well-known synchronization circuit 200 responsive to the clock pulses CL2 and the pulse signal on line 188 so that the storage unit 196 stores the depth corresponding to the first signal to appear on line 184. The stored depth appears on line 92 as described earlier with reference to FIG. 2.

When the switch 186 is in the LAST position the signals on line 184 are constantly applied by the contractor 186A to the synchronization circuit 200 so that the storage unit 196 is continually updated throughout the interval of the track gate on line 118. At the termination of the track gate, or at the termination of the last signal on line 184 to appear during the interval of the track gate, no more strobe signals appear on line 198 so that the storage unit 196 retains the depth corresponding to the last signal to appear on line 184. Accordingly, the depth data appearing on line 92 corresponds to the depth at the termination of the signals on line 184, or equivalently, the last signal of the raw data on line 56 occurring during the interval of the track gate and having an amplitude greater than that of the reference on line 170.

The third mode of operation, namely, the peak mode, is obtained by switching the mode selector switch 186 to the PEAK position. In this position the line 184 is directly connected by the contactor 186A to line 188, and the input to the summing circuit 172 on line 174 is corrected via the contactor 186B to the output of a digital-to-analog converter hereinafter referred to as D/A 202. A counter 204 is reset to 0 by the KEY signal and counts clock pulses CL1 which are passed by AND gate 206 to appear on line 208. The clock pulses CL1 are provided by the clock pulse generator 96 of FIG. 4 in a manner to be described. The clock pulses CL1 occur at a high rate relative to the bandwidth (or reciprocal of the rise time) of signals on line 56 and pass through the AND gate 206 during such intervals of time when a logic state of 1 appears on line 184 at the input to the AND gate 206. During an interval of counting by the counter 204, the D/A 202 is continually increasing its output voltage in correspondence with the increasing count of the counter 204. In this way, the output voltage of the D/A 202 is in the form of a staircase which closely approximates a ramp so that the combination of counter 204 and D/A 202 may be regarded as a ramp generator.

In the peak mode the depth corresponding to the maximum amplitude of the raw data on line 56 is obtained as follows. Upon the occurrence of the first signal on line 56 to attain an amplitude greater than the reference on line 170 during the interval of the track gate, a logic state of 1 appears on line 184 with the result that clock pulses CL1 are passed through AND gate 206 to the counter 204, whereupon the aforementioned ramp voltage appears on line 174 at the summing circuit 174. The summation of the ramp voltage on line 174 with the reference voltage on line 176 causes the reference on line 170 to increase monotonically with time until its amplitude equals that of the amplitude of the raw data on line 56. Thereupon a logic state of 0 appears on lines 180 and 184 with the result that no more clock pulses CL1 are passed to the counter 204 so that the voltage appearing at the output of D/A 202 remains constant. Similarly, the new value of the reference on line 170 also is retained at a constant value equal to the value of the voltage of the D/A 202 plus the value of the threshold voltage on line 176. No further signals appear on line 184 unless and until such time as a raw data signal on line 56 exceeds the new value of the reference on line 170. Should such a value of raw data appear on line 56, then the operation resumes with the D/A 202 providing a further increasing voltage on line 174 until the reference 170 again equals the value of the raw data on line 56. This procedure continues until the termination of the interval of the track gate. As in the case of the LAST mode described herein above, whenever a logic state of 1 appears on the line 184 the storage unit 196 updates the value of depth stored therein. Accordingly, at the termination of the track gate the depth data appearing on line 92 corresponds to the reading of the counter 194 at the last instant that the logic state of 1 appeared on line 184, or equivalently, the maximum (or peak) value of the raw data to appear on line 56.

Referring now to FIG. 4, there is shown a block diagram of the clock pulse generator 96 which provides the five clock pulse signals CL1-5. Clock pulses CL1 are provided by an oscillator having a relatively high frequency compared to the data rate of the raw data on line 56 of FIG. 1, this oscillator being shown as master clock 210 in the figure. The rate of clock pulses provided by the master clock 210 is divided down in a well-known manner by means of scaling counters 212 which provide a plurality of outputs having respective clock rates corresponding to, for example, feet, yards and fathoms. The desired output is selected by a switch 214 connecting with the scale control 108, seen also in FIG. 2, the selected output being designated as the clock pulses CL2.

The clock pulses CL2 are applied to counters 216, 218 and 220 which are shown in FIG. 4 as separate counters to facilitate explanation of the operation though it is understood that a single counter appropriately interconnected with the other elements of the clock pulse generator 96 may be utilized. The counter 216 is provided with a plurality of outputs, one from each of its stages. Thus, the stage of the most significant bit (MSB) is shown on line 222 being applied to AND gate 224, the output of AND gate 224 being applied to OR gate 226. The second input to the AND gate 224 is provided along line 228 from the $\overline{Q}$ output of flip-flop 230. When a logic state of 1 is present on line 228, pulses from the MSB stage of the counter 216 pass through the AND gate 224 and through the OR gate 226 to appear as a train of clock pulses shown as CL3. The signal on line 222 has the appearance of a square wave alternating between stages of a logical 1 and a logical 0 corresponding to the alternating values of the MSB stage of counter 216. A plurality of outputs of the counter 216 are also provided to a set of AND gates, four such outputs on lines 232A-D connecting with AND gates 234A-D being shown in the Figure. The signals on lines 232A-D all are of the square wave format and of successively increasing pulse repetition frequencies, the LSB stage providing the highest frequency while the MSB stage provides the lowest frequency. The AND gates 234A-D also have inputs provided by lines 236A-D and a logic stage of 1 on any one of the lines 236A-D permits the pulse train on the corresponding one of the lines 232A-D to pass through the corresponding one of the AND gates 234A-D and then through an OR gate 238 to AND gate 240. The second input to AND gate 240 is provided along line 242 from the Q-output of the flip-flop 230. A logic state of 1 on line 242 permits a pulse train from the OR gate 238 to pass through the OR gate 226 to appear as the clock pulses CL3. It is seen that since the flip-flop 230 is either in the set or reset condition, a logic state of 1 appears either at the Q-output or the $\overline{Q}$-output and that, accordingly, the clock pulses CL3 arrive via AND gate 240 or AND gate 224.

With reference to both FIGS. 4 and 5, it is recalled that the clock pulses 152 of graph 150 occur at a regular rate, and that additional pulses 156 are inserted between the first two clock pulses 152. The clock pulses 152 and 156 are part of the train of clock pulses Cl3. The clock pulses 152 are obtained via AND gate 224 while the clock pulses 156 are obtained via AND gate 240. It is further recalled that the number of additional clock pulses 156 is dependent on the width of the track gate, a greater number of the clock pulses 156 being inserted to accommodate a track gate of longer duration. The counter 220 and a bit detector 244 connecting with the gate width control 110 provide an appropriate interval of time during which the required number of additional clock pulses 156 are passed through the AND gate 240, such an interval being indicated in FIG. 5 by the intervals 245, some of which are further identified by suffixes A-B. As seen by the graphs 150, 246 and 248, the interval of time increase by increments of two from one graph to the next, this permitting double the number of additional clock pulses 156 to pass through the AND gate 240. And also, the corresponding track gates 158A–C share a similar relationship in that one is double the duration of the other.

With respect to the graphical recording 22 of FIG. 1, it is sufficient to provide a discrete set of tracking gates in which one is double the duration of the next smaller, such as those of FIG. 5, rather than a gate which is continuously variable or a set of tracking gates which do not differ from each other by so large an amount as the factor of 2. Accordingly, the bit detector 244 of FIG. 4 takes on a relatively simple form such as that of a switch selects a particular stage of the counter 220 to be connected with line 250. The signal on line 250 serves as a reset signal for resetting the counter 220 to 0 as well as resetting the flip-flop 230. The counter 220 begins the count when triggered by the KEY signal. For example, the counter may count to a count of 1,024 whereupon it provides a pulse via the bit detector 244 on line 250, this corresponding for example to the interval 245A of graph 150 in FIG. 5; or, as a further example, the bit detector 244 may be set by the gate width control 110 to the stage of the counter 220 corresponding to the number 2,048 in which case the counter counts to 2,048 whereupon it provides a pulse via the bit detector 244 on line 250, this corresponding to the interval 245B of the graph 246 in which the interval 245B is double that of the interval 245A.

In operation, therefore, the clock pulses CL3 which are represented by a train of clock pulses 152 of FIG. 5 are provided by the MSB stage of counter 216 via AND gate 224, and additional clock pulses 156 are inserted between the clock pulses 152, these additional clock pulses 156 arriving via the AND gate 240 and OR gate 238 from other stages of the counter 216 providing square waves of successively higher pulse repetition frequencies. The selection of AND gate 224 or AND gate 240 is provided by flip-flop 230 in response to the KEY signal which sets the flip-flop 230 and a reset signal on lne 250 which resets the flip-flop 230. The time duration between the setting and resetting of the flip-flop 230 is provided by the counter 220 which counts clock pulses CL2 to a predetermined number selected by the bit detector 244 whereupon the reset pulse is provided by the bit detector 244 on line 250 which terminates further counting by the counter 220 and resets the counter 220 to 0.

As has been mentioned earlier, it is desirable to provide an alarm system to warn an operator of the system 20 of FIG. 1 at such times when the bottom 24 of the ocean 26 undergoes a sudden change in depth, and it is furthermore desirable under such circumstances to provide an automatic widening of the track gate shown by dots 46 and 48 on the graphical recording 22. Such an alarm and a gate widening system will now be described.

Referring again to FIG. 3, the counter 252 counts the occurrences of the KEY signal and is reset by the occurrence of a pulse on line 188. Thus, under normal conditions of operation when pulse signals appear on line 184 in response to the arrival of raw data echoes on line 56 within the interval of the track gate on line 118, the count of the counter 252 does not rise above a count of 1 since for each occurrence of the KEY signal there is also an occurrence of a signal on line 188 which resets the counter 252 to 0. Should there be a sudden change in the depth of the ocean, the echo on line 56 would fall outside the interval of the track gate and accordingly no signal would appear lin line 184. Thus the counter 252 would count the absences of the ignal on line 184.

A warning horn and light system are employed utilizing a horn 254, a light 256, a driver circuit 257, a flasher circuit 258 and a switch 260 connecting with the alarm selector control 100. A set of conductors represented by line 262 connect each stage of the counter 252 with switch 260 whereby particular stages of the counter 252 are applied to the flasher circuit 258, and to the driver circuit 257 for energizing the horn 254 and light 256. In addition, the switch 260 is seen in FIG. 4 for interconnecting a selected one of the conductors in line 262 with one of the lines 236A–D as well as lines 264, some of which are further identified by suffixes A–B.

The alarm selector 100 is adjusted so that the horn 254 and light 256 are energized in response to a logic stage of 1 appearing at a selected stage of the counter 252. For example, it may be desirable to energize the horn 254 and light 256 after eight echoes on line 56 have been missed in which case the switch 260 interconnects the fourth stage of the counter 252 with the horn 254 and light 256 via the driver circuit 257. The flasher circuits 258 would, in this example, be connected to the third stage of the counter 252 to provide a flashing of the light 256 after only four echoes of the raw data on line 56 have been missed.

Referring again to FIGS. 3, 4 and 5 the switch 260 also provides for a widening of the track gate, the widening occurring when the counter 252 reaches a preselected number, as for example, the number at which the light 256 begins flashing. Thus, in the preceding example, where the flasher circuit 258 was connected to the third stage of the counter 252, this corresponding to a count of 4, the third stage of counter 252 would be interconnected by switch 260 to lines 236A and 264A, the fourth stage of the counter 252 being interconnected to lines 236B and 264B with similar interconnections of the subsequent stages of the counter 252 and the other ones of the lines 236A–D and lines 264. The variation in the pulse repetition frequency of the clock pulses CL3 to accomplish a more rapid count down of the counter 114 of FIG. 2 has been described earlier. A similar change in the pulse repetition frequency of the clock pulses CL5 to accomplish a changing gate width utilizing the counter 124 of FIG. 2 will now be described.

The clock pulses CL5 are provided by counter 218, a set of AND gates 266, two such AND gates 266 being further identified by suffixes 266A and 266B, and OR gate 268. The AND gates 266 are connected to successive stages of the counter 218 via lines 270, two such lines being further identified as 270A and 270B, these interconnections being accomplished in a manner similar to that of the interconnection of the AND gates 234A–D with ounter 216. As was described earlier with reference to counter 216, the energization of a selected ones of lines 236A–D resulted in a change in the pulse repetition frequency of the clock pulses CL3 as was seen in FIG. 5, and in a similar manner the energization of a selected one of the lines 264 results in a change in the pulse repetition frequency of the clock pulses CL5 since the interconnection of the counter 218 with the OR gate 268 via the AND gates 266 has the format of the interconnection of the counter 216 with the OR gate 238 via the AND gates 234A–D. The interconnections of the lines 270 with the counter 218 are arranged such that the line 270B provides a lower frequency pulse train than the line 270A, while as has been noted earlier with respect to the interconnections of lines 232A-D with the counter 216, line 232B provides a higher frequency pulse train than the line 232A; thereby, an increase in the pulse repetition frequency of clock pulses CL3 is provided by the alarm count on line 262 is accompanied by a decrease in the pulse repetition frequency of clock pulses CL5.

With reference to FIG. 5, the widening of the track gate by means of the gate width control 110 of FIGS. 2 and 4 has been presented by means of graphs 150, 246 and 248. The widening of the track gate by means of the alarm count on line 262 is shown by graphs 272, 274 and 276. To demonstrate the widening of the track gate by the alarm count 262A, a setting of the gate width control 110 corresponding to that of graph 150 is presumed in graphs 272, 274 and 276 for purposes of example and accordingly the graph 150 has been shown a second time in the Figure as graph 272.

With respect to graphs 272, 274 and 276, each of the track gates 158 have the same number of clock pulses 154. However, the rates of occurrence of these clock pulses 154 differs in the three graphs. In the graph 274, this rate of occurrence is one-half the rate of that of graph 272, and in graph 276 the rate has again been reduced by a factor of one-half. The durations of the track gates 158 are correspondingly increased so that the track gate of graph 276 has a duration four times that of the track gate of graph 272. It is noted that in this example the width of the track gate of the graphs 272, 274 and 276 are equal respectively to the track gates of the graphs 150, 246 and 248.

With respect to the leading edge of these track gates, the leading edges of the track gates of graph 150 and 246 as indicated by the clock pulses 152A and 152B have been positioned in time in the mabner described earlier with reference to the counter 220 and bit detector 244 of FIG. 4 by the insertion of additional clock pulses 156. Similarly, in the graph 272 and 274 the same number of additional pulses 156 are added, however, these additional pulses 156 are now provided by varying the pulse repetition frequency of the clock pulses CL3 by energizing a selected one of the lines 236A-D of FIG. 4. Thus, in graph 274 four additional pulses 156 have been added in the same amount of time previously allotted in graph 272 for two additional pulses 156, this being in accordance with the fact that the clock pulses provided by line 232B are at double the frequency of the clock pulses provided by line 232A of FIG. 4. Similar comments apply to the quadrupling of the frequency of the clock pulses 156 in graph 276.

The transmit inhibit gates previously mentioned with reference to the counter 116 and the flip-flop 138 of FIG. 2, also seen in FIG. 5 as line 162, is now described in further detail with reference to FIGS. 2, 4 and 5. The additional clock pulse 166B is provided in the relatively short interval 278 of FIG. 5, immediately following the interval 245 by means of multivibrator 280, AND gates 282A-B and OR gate 284 of FIG. 4. The multivibrator 280, a one shot or monostable multivibrator, is triggered by the signal on line 250, and in response thereto, provides a logic state of 1 at the Q-output for the duration of the short interval 278 and then reverts to its reset state in which the logic state of 1 appears at the $\overline{Q}$-output with a logic state of 0 at the Q-output. The AND gates 282A and 282B are activated in response to the logic states of 1 at the respective outputs of Q and $\overline{Q}$,. Prior to the occurrence of the signal on line 250 the clock pulses CL3 pass via the AND gate 282A and the OR gate 284 to appear also as the clock pulses CL4. During the short time interval 278, the additional pulses 166B arrive via the AND gate 282B from a line having a relatively high rate of clock pulses, such as line 232D. The operation of the multivibrator 280 occurs independently of the particular line 236A-D which is energized and, accordingly, the leading edge of the transmit inhibit gate 162 of FIG. 5 precedes the leading edge of each of the track gates 158 by the same amount of time in each of the graphs of FIG. 5.

Referring now to FIG. 6 there is shown an enlarged view of the recorder 44 of FIG. 1 further demonstrating the displaying and operation of the track gate. As in FIG. 1, the track gate is indicated by the dots 46 and 48 representing respectively the leading and trailing edges. The marks 40 of FIG. 1 have been coded in FIG. 6 to distinguish between a valid depth signal, a missd return (an echo received outside the track gate), and a mark designated "alarm" which indicates that a sufficient number of echoes (in this example, two) has been received to activate the alarm and gate widening circuitry of FIGS. 3 and 4. Each track gate is further shown by means of a bracket to more readily indicate an estimated range of possible values of depth anticipated for a succeeding echo, the estimation or gate being centered about the depth represented by the preceding echo.

FIG. 6 depects the situation where the ocean depth is rapidly changing with the result that, in the region of rapid change, the echoes fall near the trailing edge of the track gate, and may even fall outside the gate where the gate width is insufficient to accommodate the rapid rate of change. The digitizer 36 of FIG. 1, being responsive to this rate of change, automatically widens the gate, in this example the widening being accomplished in two steps, the first step doubling and the second step again doubling the gate width to quadruple the original width. As seen in the Figure, the quadrupled gate width is adequate to enclose the next occurring echo whereupon the counter 252 of FIG. 3 is reset and the gate width returns to the original width as selected by the gate width control 110 of FIG. 2.

Figure 7:
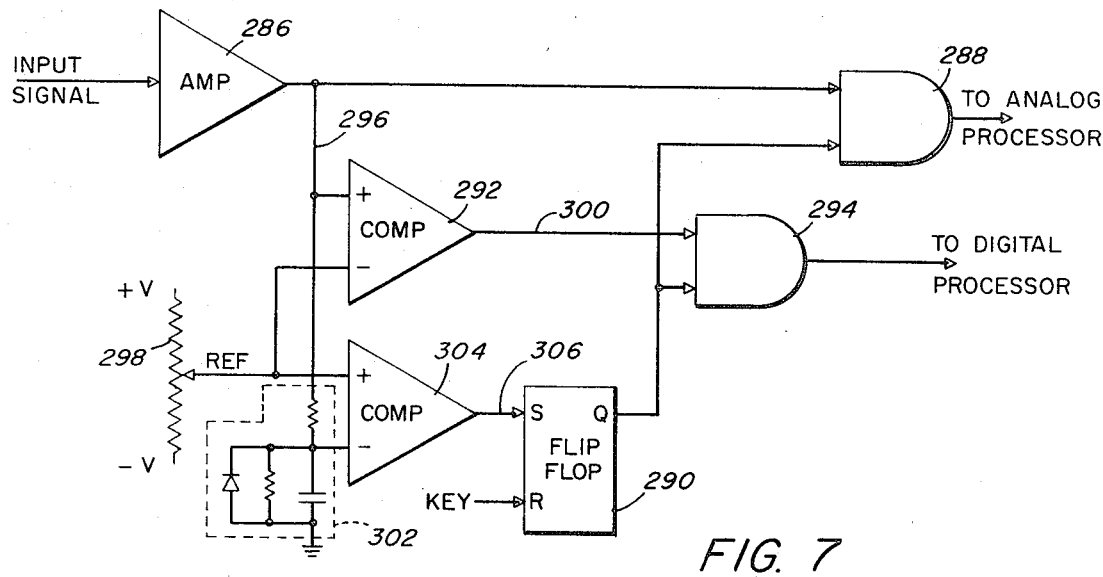
FIG. 7 is a diagram of an alternative circuit for inhibiting the presence of reverberations in a received echo.

Referring now to FIG. 7, there is shown an alternative means of compensation for transmitter reverberation which may be used in lieu of the transmitter inhibit circuitry of FIGS. 1 and 2, particularly in those situations where the initial portion of a received echo is of primary concern. An amplifier 286, analogous to the amplifier 54 of the transceiver 28 in FIG. 1, is provided for amplifying an input signal or echo. The output of the amplifier 286 is passed through an analog gate 288 when a logic state of 1 appears at the Q-output of flip-flop 290. As will be seen, this logic state of 1 is established after the transmitter reverberations have substantially died out so that only signals free of reverberation pass through the analog gate 288. Similarly, digitized data provided by comparator 292, as described below, is passed by AND gate 294 after the reverberations have substantially died out. Thus the circuit of FIG. 7 provides signals suitable for both analog and digital processing respectively from analog gate 288 and AND gate 294. For example, the signal passed by the analog gate 288 may be applied via line 56 to the data mode unit 94 of FIG. 3.

The digitizing of the output signal of amplifier 286 on line 296 by comparator 292 is accomplished by applying this output signal as well as a reference signal from potentiometer 298 to the comparator 292. During those portions of the signal (a sinusoid) on line 296 which are greater than the reference signal, the comparator 292 provides a logic state of 1 on line 300, and a state of 0 otherwise. Thus a sinusoid is converted into a series of rectangular pulses.

The circuit of FIG. 7 is made responsive to reverberations by means of the flip-flop 290 and a detector circuit 302 comprising two resistors, a capacitor and diode. The KEY signal of FIG. 2 resets the flip-flop 290 at the beginning of a transmission of sonic energy (as by the transmitter 50 and transducer 30 of FIG. 1) whereupon no signals are passed by gates 288 and 294. At the same time, a small fraction of the transmitted signal as may be provided by leakage in the T-R switch 52 of FIG. 1 charges up the detector circuit 302 whereupon the detector circuit 302 provides a voltage to comparator 304 greater than the reference voltage of potentiometer 298. The detector circuit 302 discharges shortly after the transmission of sonic energy and its reverberations die out with the result that a negative pulse appears at the output of the comparator 304 on line 306. The flip-flop 290 is set by the trailing edge of the pulse on line 306 thereby restoring the logic state of 1 at the Q-output so that echo signals subsequent to these reverberations can pass through the gates 288 and 294.

It is understood that the above-described embodiments of the invention are illustrative only and the modifications thereof will occur to those skilled in the art. Accordingly, it is desired that this invention is not to be limited to the embodiments disclosed herein but is to be limited only as defined by the appended claims.

What is claimed is: said

1. In combination:
means for transmitting sequential quanta of radiant energy towards an energy reflecting subject;
means responsive to quanta of radiant energy reflected from said subject for recording the occurrences of said reflections as a function of the distance from said transmitting means to said subject;
means for estimating a range of values of said distance for a succeeding reflection of said energy; and
means for displaying said estimate superposed about a recording of said succeeding reflection, said displaying means including means for displaying a sequence of past values of said estimates superposed about a sequence of past values of the recordings of said occurrences of said reflections simultaneously with said displaying of said estimate superposed about said recording of said succeeding reflection.

2. The combination of claim 1 wherein said estimation means comprises means for varying said estimated range of values in accordance with a rate of change of said distance.

3. A combination according to claim 1 wherein said estimating means comprises:
means for measuring the time elapsed from said transmission of radiant energy and said reception of radiant energy;
means responsive to said elapsed time measurement for providing a first signal at the end of a time interval shorter than said elapsed time by a first preset interval; and
means responsive to said first signal for providing a second signal at a second preset interval of time subsequent to said first signal, said second preset interval being greater than said first preset interval, said second preset interval being proportional to said range of values.

4. A combination according to claim 3 wherein said estimating means further comprises:
a generator of clock pulses at a plurality of repetition frequencies;
means for coupling said clock pulses to said second signal providing means;
said second signal providing means including a counter of said clock pulses; and
means responsive to said reflected radiant energy for selecting the repetition frequency of said clock pulses.

5. A ranging system comprising:
means for recording signals received in time as a function of the length of propagation path of said signals;
means for gating such signals; and
means for widening said gat when a predetermined number of such signals occur outside said gate, said widening means including means for counting clock pulses, said widening means further comprising means for varying a rate of occurrence of said clock pulses independently of a rate of occurrence of said received signals, said variation in said rate of clock pulses resulting in a variation of the counting time of said counter to provide said widening of said gate.

6. The system according to claim 5 further comprising means for repositioning said gate corresponding to the time of arrival of a preceding one of sai signals.

7. The system according to claim 6 further comprising means for varying said predetermined number.

8. The system according to claim 7 wherein said repositioning means is responsive to one of a set of preselected characteristics of such signals, the system further comprising means for selecting said characteristics.

9. The system according to claim 8 wherein said preselected characteristics are the first portion of such signal to cross a threshold within said gate, the last portion of said signal to cross a threshold within said gate, and the peak value of such signal within said gate.

10. A ranging system according to claim 5 wherein said gating means includes a processor of said signals comprising:
means for comparing said signals with a reference;
means coupled to said comparing means for counting occurrences of said signals wherein the magnitudes of said signals exceed said reference;
means for altering the magnitude of said reference in accordance with the value of said count; and
means for indicating the time of occurrence of a maximum value of said count occurring within a gate provided by said gating means.

11. A system according to claim 10 wherein said signal processor includes means coupled to said comparing means for indicating the time of occurrence of a first and of a last occurrence of one of said signals which have a magnitude exceeding the magnitude of said reference.

12. A data processor comprising:
means for receiving an input signal;
means responsive to an initiating signal and coupled to an output of said receiving means for measuring an interval of time elapsed from said initiating signal until said received signal;
timing means coupled to said measuring means, said timing means being preset with said elapsed time measure in response to said initiating signal for providing a timing signal dependent on the magnitde of said elapsed time; and
means coupled to said timing means for generating a gate in response to said timing signal, said receiving means including means for gating said received input signal, said gating means being operative by a gate signal provided by said gate generating means and said gate generating means comprising a generator for providing a marker signal for designating the occurrence of a specific part of said gate.

13. A data processor according to claim 12 further comprising means coupled to said gate generating means for gating said initiating signal at a cime designated by said timing means.

14. A data processor according to claim 12 wherein said receiving means comprises means for comparing the received signal with a reference, means activated by said comparing means for counting a series of clock signals during an interval of an output signal of said comparing means, and means coupled to said counting means for providing the value of said reference in accordance with the magnitude of the count of said counting means.

15. A data processor according to claim 14 wherein an output signal of said comparing means terminates when the value of said reference rises above the value of said received signal.

16. A data processor according to claim 15 including means coupled to the output of said comparing means for storing a value of said elapsed time when the value of said reference rises above the value of said received signal.

17. A data processor according to claim 12 wherein said receiving means comprises means for comparing a received signal with a reference, and means responsive to an output of said comparing means for storing a value of said elapsed time when the value of said received signal falls below the value of said reference.

18. A data processor according to claim 12 wherein said receiving means comprises means for comparing said received signal with a reference, and means coupled to said comparing means for storing a value of said elapsed time when the value of said received signal rises above the value of said reference.

19. A data processor according to claim 12 further comprising means for comparing a received signal with a reference, means for counting successive occurrences of said initiating signal, means for selectively measuring the time of occurrence of a first and a last and a peak value of such portion of said input signal having a value which exceeds a value of said reference, and means coupled to said means for measuring said first and last and peak values for resetting said initiating-signal counting means.

20. A data processor according to claim 19 further comprising means coupled to said initiating-signal counting means for indicating when the count of said initiating-signal counting means exceeds a preset value.

21. A data processor according to claim 19 wherein said gate generating means comprises means responsive to the value of the count of said initiating-signal counting means for sequentially increasing the duration of said gate in accordance with a sequence of increasing values of said count.

22. A data processor according to claim 21 wherein said means for sequentially increasing the duration of said gate comprises a counter, said timing means comprises a source of clock pulses having selectable pulse repetition frequencies, said counter of said gate generating means counting said clock pulses of said timing means, and said initiating-signal counting means being coupled to said timing means for selecting individual ones of said pulse repetition frequencies in accordance with the value of a count of said initiating-signal counting means.

* * * * *